(12) United States Patent
Lu et al.

(10) Patent No.: US 11,299,117 B2
(45) Date of Patent: Apr. 12, 2022

(54) ENERGY ABSORBING DEVICE

(71) Applicant: City University of Hong Kong, Kowloon (HK)

(72) Inventors: Jian Lu, Kowloon (HK); Yuan Gao, North Point (HK); Tao Tang, Kowloon (HK); Lu Yao, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 15/477,166

(22) Filed: Apr. 3, 2017

(65) Prior Publication Data
US 2018/0281715 A1 Oct. 4, 2018

(51) Int. Cl.
*B60R 19/34* (2006.01)
*F16F 7/12* (2006.01)

(52) U.S. Cl.
CPC ............... *B60R 19/34* (2013.01); *F16F 7/12* (2013.01)

(58) Field of Classification Search
CPC . B60R 19/18; B60R 19/24; B60R 2019/1806; B60R 19/1813; B60R 19/34; F16F 7/12
USPC .......................................... 293/102, 132, 133
See application file for complete search history.

(56) References Cited

U.S. PATENT DOCUMENTS

| | | | | |
|---|---|---|---|---|
| 3,983,962 A * | 10/1976 | Torke | ................... | B62D 21/152 188/377 |
| 3,995,901 A * | 12/1976 | Filbert, Jr | ............... | B60R 19/18 267/140 |
| 4,023,652 A * | 5/1977 | Torke | ........................ | F16F 7/12 188/377 |
| 4,152,012 A * | 5/1979 | Reidelbach | ............. | B60R 19/34 280/784 |
| 4,194,763 A * | 3/1980 | Reidelbach | ............. | B62D 21/00 280/784 |
| 4,272,114 A * | 6/1981 | Hirano | ..................... | B60R 19/34 188/377 |
| 6,174,009 B1 * | 1/2001 | McKeon | .................. | B60R 19/34 188/377 |
| 7,290,811 B1 * | 11/2007 | Arns | ....................... | B60R 19/24 293/133 |
| 7,413,226 B2 * | 8/2008 | Muskos | .................. | B60R 19/34 293/133 |
| 7,651,155 B2 * | 1/2010 | Tan | .......................... | B60R 19/34 293/133 |
| 8,276,954 B2 * | 10/2012 | Handing | ................. | B60R 19/03 293/133 |
| 9,616,833 B2 * | 4/2017 | Lee | .......................... | B60R 19/34 |
| 2006/0096099 A1 * | 5/2006 | Cripsey | .................. | B21D 53/88 29/897.2 |
| 2009/0026777 A1 * | 1/2009 | Schmid | .................... | B60R 19/34 293/133 |
| 2009/0115208 A1 * | 5/2009 | Kano | ........................ | F16F 7/12 293/132 |
| 2010/0032970 A1 * | 2/2010 | Nishiguchi | ............. | B22D 17/00 293/132 |

(Continued)

*Primary Examiner* — Hilary L Gutman
(74) *Attorney, Agent, or Firm* — Renner Kenner Greive Bobak Taylor & Weber

(57) ABSTRACT

An energy absorbing device includes a deformable elongate member that is arranged in a manner such that the device, in use, deforms in a controlled manner upon the absorption of impact energy. The invention also provides a method for manufacturing the energy absorbing device.

13 Claims, 4 Drawing Sheets

(56) References Cited

U.S. PATENT DOCUMENTS

| | | | | |
|---|---|---|---|---|
| 2010/0084892 A1* | 4/2010 | Yoshida | ............ | B21D 7/08 |
| | | | | 296/203.02 |
| 2011/0187135 A1* | 8/2011 | Kano | ............ | B60R 19/34 |
| | | | | 293/133 |
| 2013/0278016 A1* | 10/2013 | Kia | ............ | B60R 19/03 |
| | | | | 296/193.02 |
| 2013/0300138 A1* | 11/2013 | Banasiak | ............ | B60R 19/34 |
| | | | | 293/133 |
| 2014/0346790 A1* | 11/2014 | Kale | ............ | B60R 19/18 |
| | | | | 293/133 |
| 2014/0353990 A1* | 12/2014 | Ishitobi | ............ | B60R 19/34 |
| | | | | 293/133 |
| 2015/0329144 A1* | 11/2015 | Hara | ............ | B62D 21/152 |
| | | | | 296/187.09 |
| 2017/0233008 A1* | 8/2017 | Otsuka | ............ | B62D 21/02 |
| | | | | 296/193.05 |
| 2018/0043937 A1* | 2/2018 | Sopel | ............ | B62D 21/152 |

\* cited by examiner

ENERGY ABSORBING DEVICE

TECHNICAL FIELD

The present invention relates generally to an energy absorbing device. Embodiments of the invention have application in the area of impact absorption in the event of a collision between two vehicles. A specific embodiment of the invention finds particular, but not exclusive, use in the provision of a crash box for installation on a motor vehicle chassis.

BACKGROUND ART

The ability of a structure to protect its occupants during an impact is one of the most important properties for the passive safety system on motor vehicles.

In modern vehicles, part of the energy absorbing structure utilised to protect occupants during an impact or collision is termed a "crash box". As the name implies, a crash box is a structure arranged to absorb kinetic energy in a controlled manner. The crash box is typically mounted between a vehicle's "bumper" and a longitudinal rail on the chassis of the vehicle.

Crash boxes are engineered such that, in a low-speed impact or collision, the crash box collapses and absorbs impact first, prior to other structural components in the vehicle absorbing the impact. In effect, the crash box converts the impact energy of the collision into deformation work to prevent or minimize the damage of the chassis of the vehicle.

By absorbing a substantive portion of the impact energy, less energy is transmitted into the vehicle cabin, and in turn, the energy imparted directly into passengers in the vehicle is also reduced. This absorption of energy therefore lowers the risk of the passenger injuries.

It follows that materials with excellent energy-absorption capability are preferred when designers and engineers seeks to design and manufacture a crash box. However, such materials can be expensive to produce and shape, may be heavy (thereby adding weight to the vehicle) and may have other issues, such as longevity issues.

It is with these shortcomings of the prior art in mind that embodiments of the present invention have been developed.

SUMMARY OF THE INVENTION

In a first aspect, the invention provides an energy absorbing device comprising a deformable elongate member that is arranged in a manner such that the device, in use, deforms in a controlled manner upon the absorption of impact energy.

In an embodiment, at least one of an interior portion and an exterior portion of the deformable elongate member is arranged to deform in a controlled manner. Further, the at least one of an interior and an exterior portion may be treated to provide at least one area of non-uniform strength distribution. Preferably, the at least one area of non-uniform strength distribution has a yield strength of at least 0.2% higher than a corresponding untreated portion.

In one embodiment, the at least one portion of an area of non-uniform strength distribution is formed by a physical process. The physical process may be a surface manipulation technique, such as a Surface Mechanical Attrition Treatment (SMAT).

The at least one portion of an area of non-uniform strength distribution may be formed by at least one of a laser sintering technique, a temperature annealing technique, a magnetic technique, the application of electric current, and the application of light.

In an embodiment, the at least one portion of an area of non-uniform strength distribution is linearly shaped. There may be provided a plurality of areas of non-uniform strength distribution which form a pattern.

The transverse cross section of the deformable elongate member may be one of a polygon, a triangle and a parallelogram, or alternatively, the transverse cross section of the deformable elongate member is an irregular shape.

The energy absorbing device may have a frustum-like shape.

The device may include a first fastening plate attached to a first end of the deformable elongate member and/or a second fastening plate attached to a second end of the deformable elongate member.

In a second aspect, the invention provides a vehicle chassis incorporating an energy absorbing device in accordance with the first aspect of the invention, wherein the energy absorbing device is mounted on a longitudinal rail of the vehicle.

In a third aspect, the invention provides a vehicle incorporating the chassis in accordance with the second aspect of the invention. The vehicle may further include a bumper attached to the energy absorbing device.

In a fourth aspect, the invention provides a method of manufacturing an energy absorbing device, comprising the steps of forming a deformable elongate member from a suitable material, treating the deformable elongate material to vary the properties of the member such that, in use, the member deforms in a controlled manner upon the absorption of impact energy.

The method may comprise the further step of shaping the member to further vary the properties of the member such that, in use, the manner in which the member deforms is further controlled.

BRIEF DESCRIPTION OF DRAWINGS

Notwithstanding any other forms which may fall within the scope of the present invention, a preferred embodiment will now be described, by way of example only, with reference to the accompanying drawings in which.

DESCRIPTION OF EMBODIMENTS OF THE INVENTION

Overview

Figure 1:
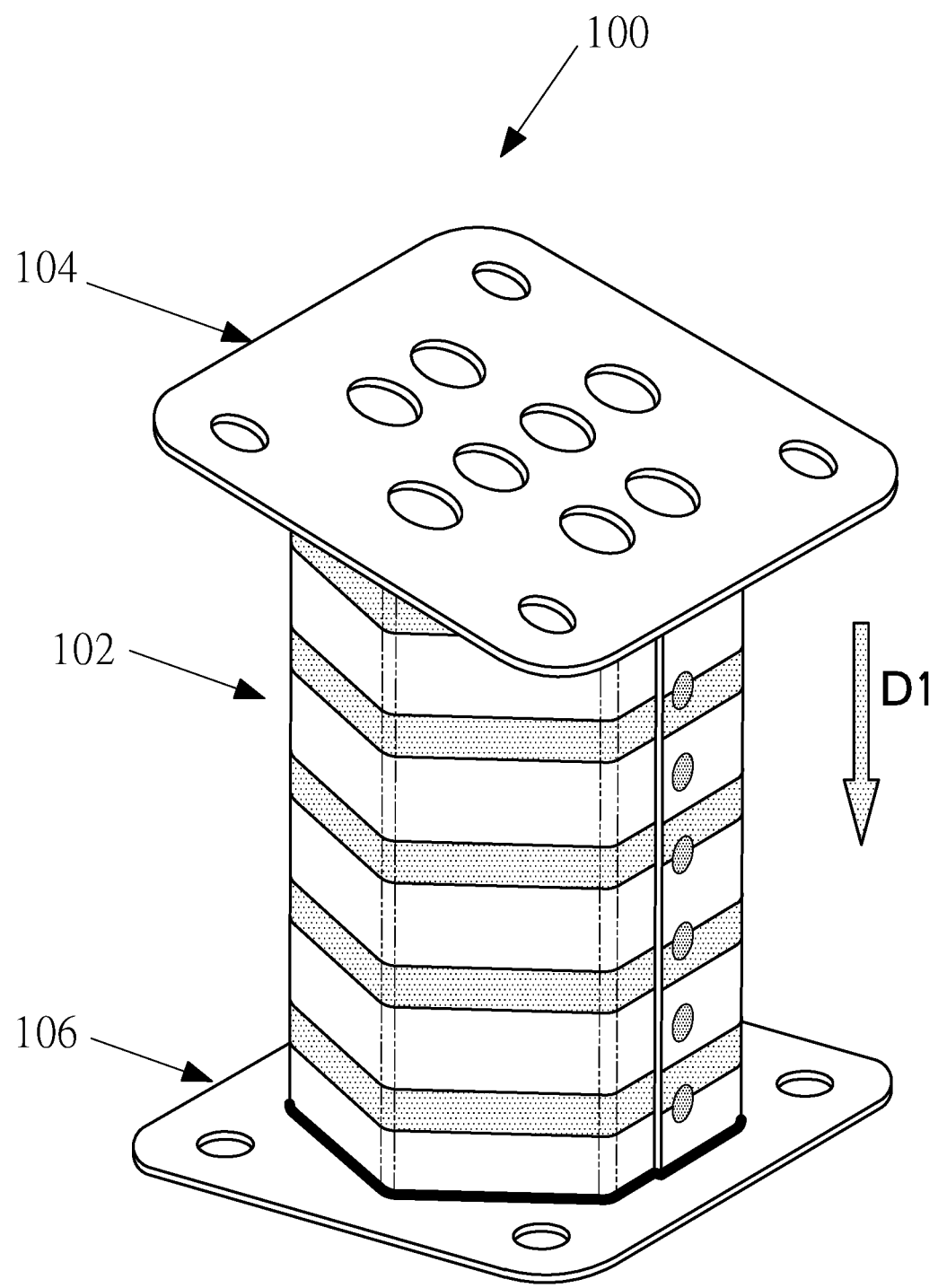
FIG. 1 is a basic perspective illustration of an energy absorbing device, in the form of a crash box, according to an embodiment of the present invention.

Throughout FIGS. 1 to 4, where the same or corresponding elements or features are shown in different figures, the same or corresponding elements or features are generally indicated using the same reference numerals.

Broadly, an embodiment of the invention is directed to a crash box mounted between a bumper and a longitudinal rail of a motor vehicle. The crash box embodiment includes a tube made of sheet steel which has a polygonal transverse cross section with one angled end, a front fastening plate welded to the angled end of the tube and constructed to connect the crash box to the bumper of the vehicle with bolt fasteners, and a rear fastening plate welded to the flat end of the tube and constructed to connect the crash box to the longitudinal rail with bolt fasteners.

Crash Box

Referring now to FIG. 1, there is shown a perspective illustration of an energy absorbing device in the form of a crash box according to an embodiment of the present invention, generally designated by reference numeral 100. The crash box 100 is generally mounted between a vehicle bumper beam (not shown) and a longitudinal rail (also not shown) of a motor vehicle, so as to be used as an energy-absorption member in the event of impact. Arrow D1 designates the likely impact direction.

Figure 2:
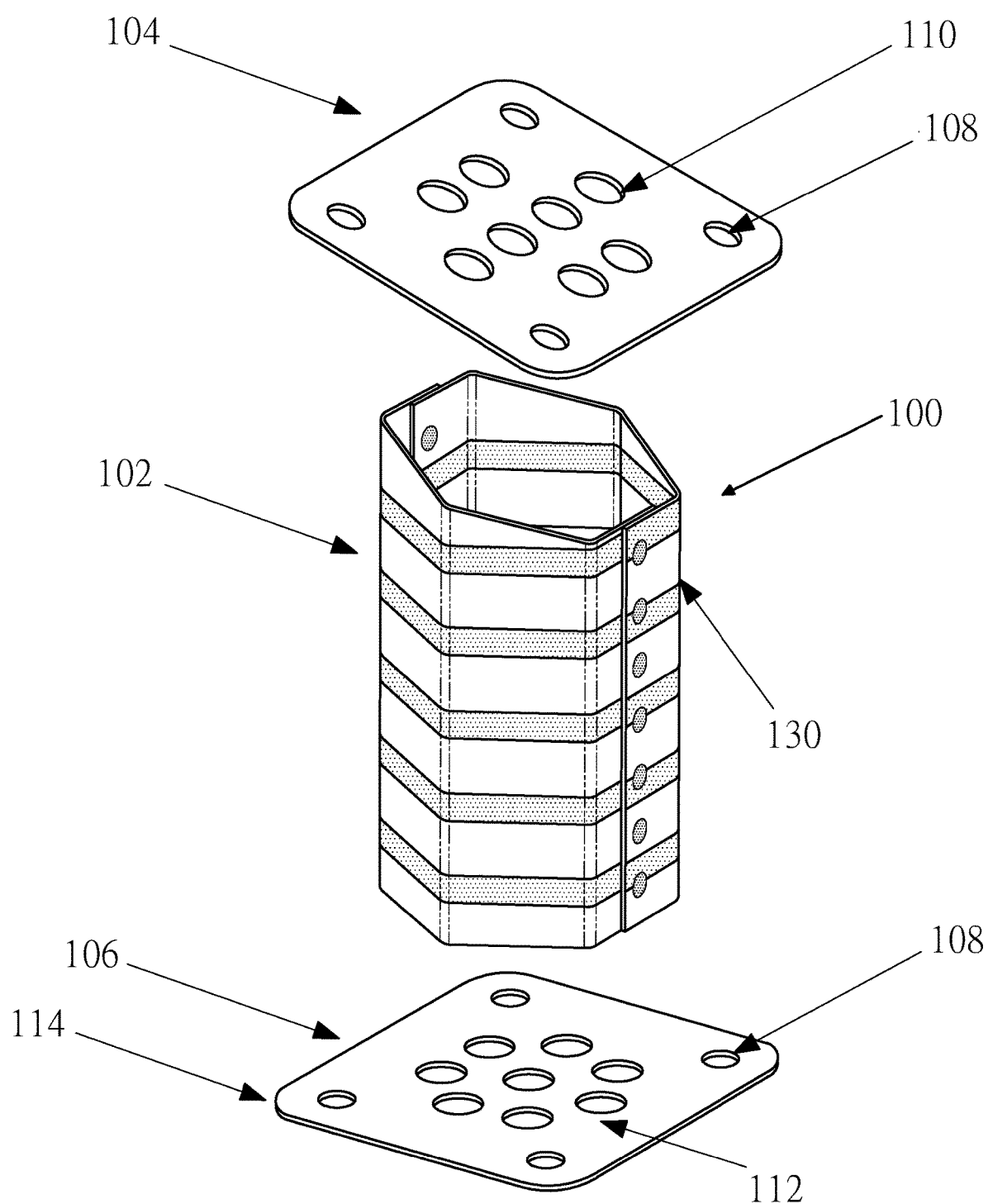
FIG. 2 is an exploded illustration of the crash box of FIG. 1.

Referring now to both FIGS. 1 and 2, in FIG. 2 there is shown an exploded illustration of the crash box 100, which includes an outer tube 102, a front fastening plate 104 and a rear fastening plate 106. The two fastening plates 104 and 106 are, in the embodiment illustrated, welded to the two proximal ends of the tubes. However, it will be understood that the two fastening plates 104 and 106 may be fastened utilising any suitable bonding technique that provides appropriate structural rigidity. This may include integrally forming the plates onto the outer tube, or utilising an adhesive, such as an epoxy adhesive. Alternatively, more conventional forms of bonding may be utilised, such as the use of rivets, bolts, etc.

Both the front and rear fastening plate 104 and 106, made of high strength stainless steel type 304, have a rectangular shape with four holes 108 near the four corners to allow the crash box 100 to be installed as described above. The holes 108 are sized to receive bolts and/or screws to join the crash box 100 to the bumper and longitudinal rail.

The frontal fastening plate 106 has a pattern of holes 110 in the central area of the plate to reduce the weight without substantively affecting the desired structural rigidity. The rear fastening plate 106 also has a pattern of holes 112 in the central area of the plate to reduce weight. The thickness of the two plates 104 and 106 are both set to be 2.0 mm (twice of the thickness of the tube 4) for strength and stiffness consideration.

The fastening plates are chamfered (as indicated by numeral 114) at the corners to save weight. Since the areas are designed to be larger than the enclosed areas by the proximal end profiles of the tube 102, the fastening plates 104 and 106 are directly welded to the tube 102 by use of a MIG welding technique.

The thickness of the plates may be larger (approximately 1.5 to 2.5 times) than the thickness of the tube so that the plates are strong enough to guarantee joint strength and avoid affecting the buckling of the tube in the event of impact. The plates, in the embodiment, are made of Advanced High-Strength Steel (AHSS) or Ultra High Strength Steel (UHSS).

The front and rear fastening plates have been described as having a rectangular shape with an area larger than the transverse cross-section area of the tube so that the plates may be directly joined to the proximal end of the tube, it will be understood that the plate may be any suitable shape to suit a specific application or vehicle design, including but not limited to a circular or polygonal shape.

Manufacturing

The tube 102, in the embodiment, is formed from a high strength stainless steel (such as Type 301 stainless steel, which has high strength and excellent corrosion resistance).

In more detail, the tube may be made of an Advanced High Strength Steel (AHSS) or Ultra-High Strength Steel (UHSS) with good ductility properties. The original 0.2% yield strength of the tube may be greater than or equal to 600 MPa. A suitable steel is a steel with a 0.2% yield strength of greater than or equal to 750 MPa and an elongation of greater than or equal to 20%. A preferred steel is a steel with an elongation of greater than or equal to 30%.

The forming (i.e. manufacturing process) is illustrated with reference to FIG. 3, and in the embodiment described herein, includes four principal steps.

Figure 3:
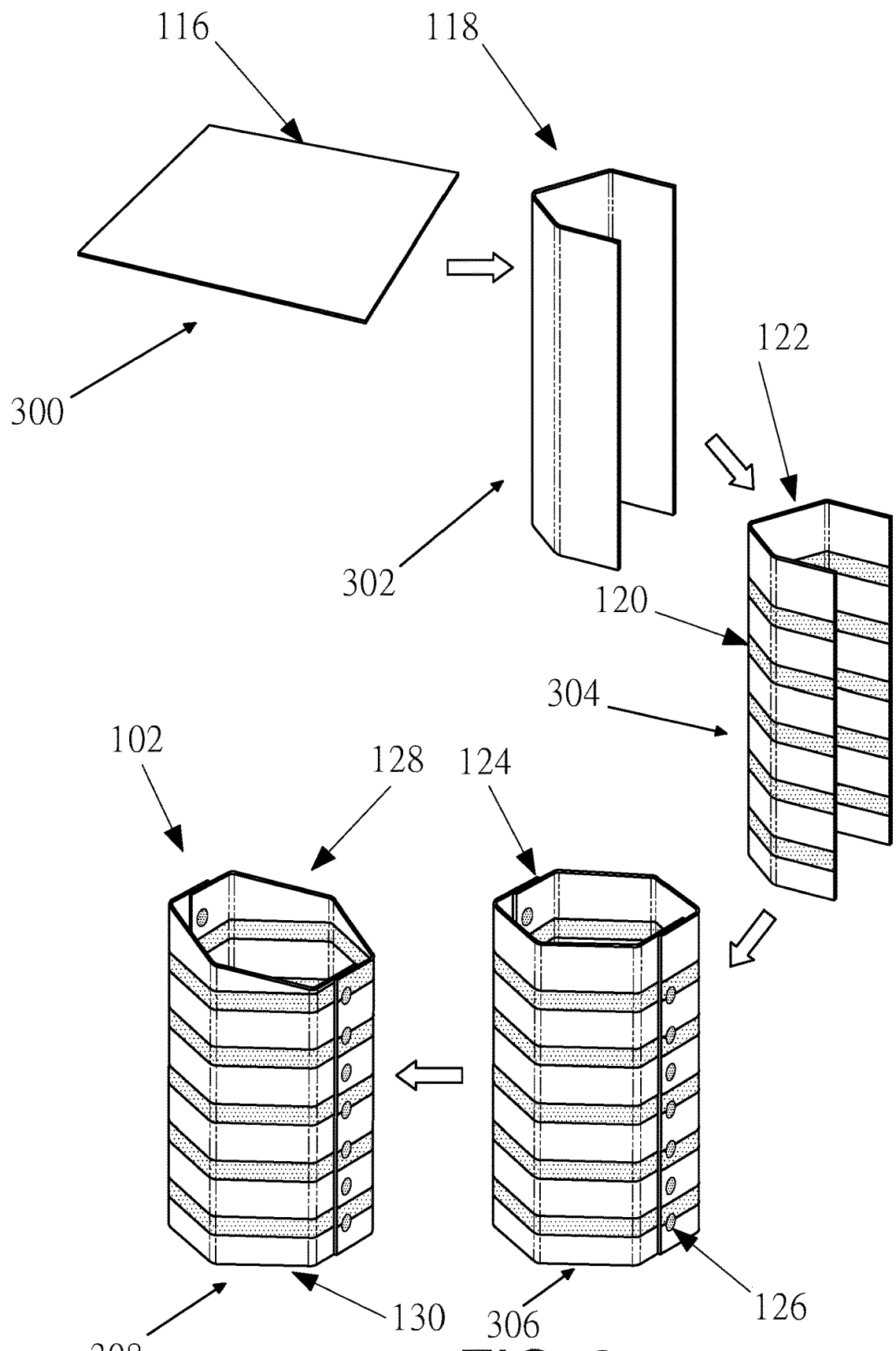
FIG. 3 is an illustration of the process steps used to form the outer tube of the crash box of FIG. 2.

Referring to FIG. 3, at step 300, a single piece of rectangular plate with a thickness of 1.0 mm, is shaped into a half hexagonal shaped piece 118 by means of a cold bending machine. The plate is shape such that the angle between each two respective adjacent surfaces of the half-hexagonal shape is 120°.

At step 302, a process of Surface Mechanical Attrition Treatment (SMAT) is utilised to treat the tube surface to locally enhance the yield strength of the steel material, so as to generate five stripe-like enhanced strength regions 120 which extend around the circumference of the tube piece 116.

FIG. 3 illustrates preferred dimensions of the locally enhanced regions. The original 0.2% yield strength of the type 301 stainless steel is 750 MPa, but is enhanced by the SMAT technique to ideally reach over 1,000 MPa. The enhanced strength distribution pattern ensures the tube 116 will buckle (upon the application of a force) in a stable manner.

In the context of the present specification, references to "buckling in a stable manner" means that, on application of a force to the energy absorbing device in accordance with an embodiment of the invention, the device collapses in a regular and repeatable manner. In other words, the device deforms or "crumples" into the manner akin to a bellows, and does so in a reproducible and/or repeatable manner. In contrast, "unstable buckling" implies the occurrence of unwanted bending or buckling during collapse.

After material treatment, the preferred 0.2% yield strength of the tube is greater than or equal to 1,000 MPa and the elongation is greater than or equal to 30%.

As described above, the embodiment includes material strength distribution patterns which are formed in a sheet of metal by the use of physical treatment and/or chemical treatment methods to create treated portions that locally enhance the material strength. The treated portions have a higher strength than untreated portions such that the buckling process starts at the untreated portions and the treated portions work as a firm skeleton to avoid entire buckling of the tube at the early stage. In this way, the buckling progresses in an orderly manner.

It will be understood that the material treatment technologies may include mechanical treatments, laser sintering, temperature annealing, use of chemicals to vary pH, solvent swelling, magnetism, electric current, light and/or chemical oxidation, etc.

In a different embodiment, the tube may incorporate separate reinforcing components or a variation of the wall thickness of the tube as an alternate mechanism for creating areas of higher and lower strength. Such variations are within the purview of a person skilled in the art.

At step 304, two half hexagonal half shaped pieces are welded together 122 into a regular hexagonal shaped tube 124 having a side length of 50 mm. In the embodiment described, the welding utilised is spot welding technology with the welding spots marked as 126. Again, while the embodiment described herein refers to welding, it will be appreciated that the tube may also be formed by extrusion or any other suitable manner.

Figure 4:
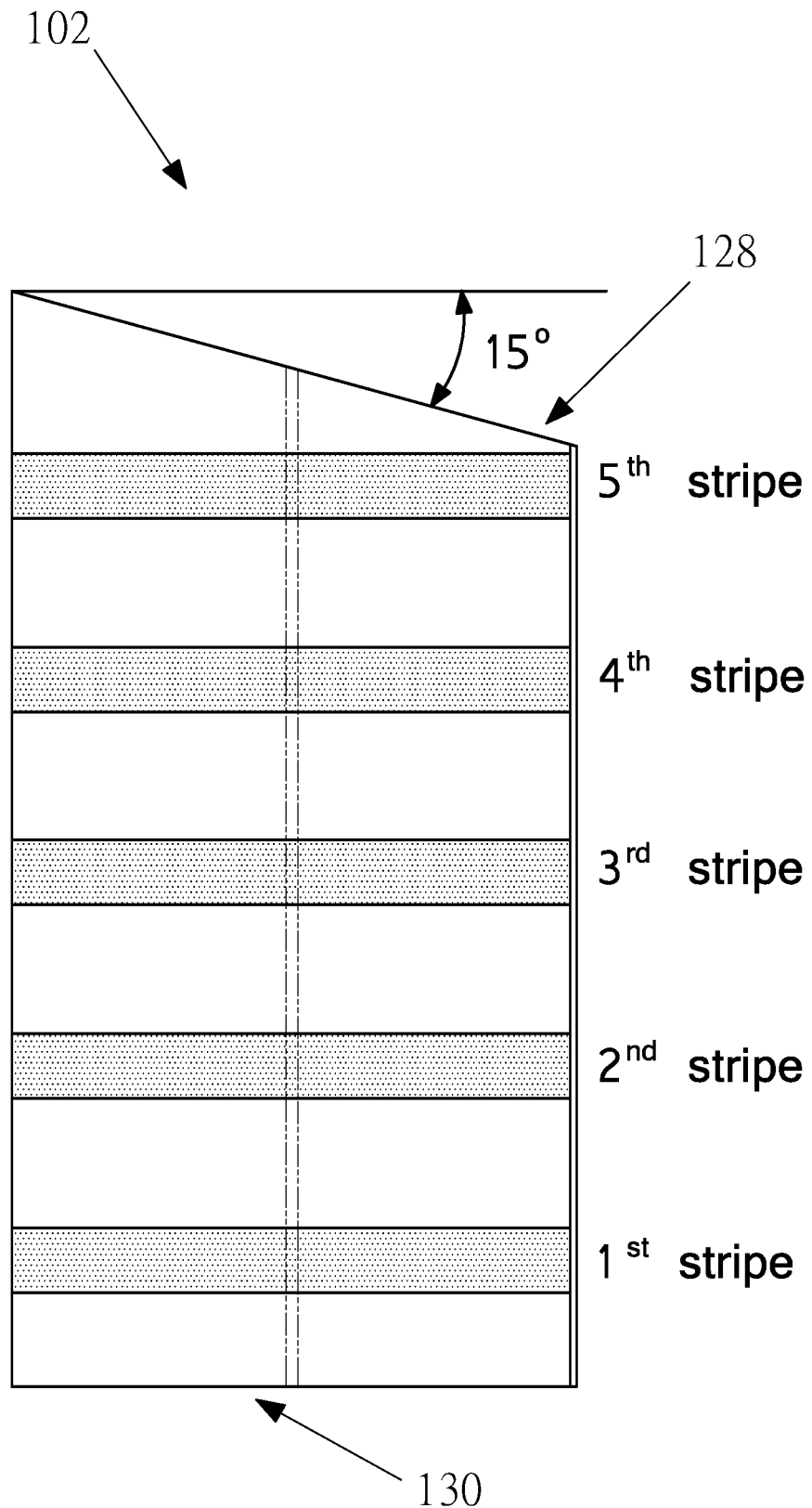
FIG. 4 is an illustration of a side view of the tube of the crash box.

At step 306, one end of the tube is trimmed to introduce a sloped end 128 with the angle between the sloped surface and the flat plane vertical to the tube axis of between 10° and 20° and preferably 15°, as shown in FIG. 4.

At step 308, the other end of the tube is trimmed to form a flat end 130 which is vertical to the tube axis. The completed tube 102, in the preferred embodiment, has a maximum length L of 170 mm.

The tube 102 is described as having a hexagonal transverse cross section. However, it will be understood that such a shape is chosen for convenience of manufacture, and the embodiment described herein is not intended to limit the broader inventive concept of the invention. It will be understood that alternative shapes, such as an octagon, a decagon or any other polygon may be utilized and, correspondingly, the manufacture process may also be altered to accommodate the formation of such shapes, such as by using extrusion or other known methods of forming shaped steel.

Advantages

In the embodiment described, the tube has a sloped end and a flat end. The flat end (rear end) surface is arranged to facilitate installation to the longitudinal rail. The creation of the sloped end (front end), which is joined, in use, with the bumper, is shaped to gradually increase the contact area at an early stage of impact so that the reaction force applied on the crash box body in an axial direction is gradually increased and at the same time the probability of a collapse starting from a rear portion of the crash box is reduced. Slowly increasing the force results in a low deceleration being applied to any passengers in the vehicle, which advantageously lowers the initial peak force exerted on the passengers and in turn, reduce the risk of injury caused by high deceleration.

In a preferred embodiment, the tube is constructed of a single sheet of a metal material but is treated such that the material strength and the yield strength in particular, is not uniform but rather is distributed in an appropriate pattern throughout the sheet so that the tube buckles and/or deforms in a controlled and stable manner according to a predefined pattern. The regions with higher strength have different buckling characteristics compared with the lower-strength regions so that the pattern advantageously controls the buckling by controlling the position, range and sequence of deformation during an impact. That is, the use of patterned yield strength changes makes a better utilization of the material during plastic deformation to in turn realize a higher energy absorption capability.

In one embodiment, the tube may have a tapered shape with widening ends (in particular at the longitudinal rail proximal end of the tube). The tapered configuration advantageously enhance the side stiffness of the crash box and the ability to resist tensile force may also be improved in other situations such as, for example, during the towing of the motor vehicle.

Disclaimers

It will be appreciated by persons skilled in the art that numerous variations and/or modifications may be made to the invention as shown in the specific embodiments without departing from the spirit or scope of the invention as broadly described.

It will also be appreciated that the embodiments of the invention as represented in the figures are not necessarily drawn to scale and moreover, that features of the embodiments may be illustrated by the use of graphic symbols, phantom lines, diagrammatic representations and fragmentary views.

Moreover, where a feature or detail would be obvious to a person skilled in the art and is not necessary for an understanding of the inventive aspect and/or features of an embodiment of the present invention, it will be appreciated that the feature may be omitted from the figures. The present embodiments are, therefore, to be considered in all respects as illustrative and not restrictive.

It will be understood that the crash box and the energy absorbing device described and defined herein may be manufactured in any suitable dimensions to suit particular applications and/or vehicles. Such variations are within the purview of a person skilled in the art.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The invention claimed is:

1. An energy absorbing device comprising a first half hexagonal shaped piece of material and a second half hexagonal shaped piece of material joined together as a hexagonal shaped deformable elongate member, the hexagonal shaped deformable elongate member having a plurality of enhanced strength regions and having a plurality of untreated portions such that the device, in use, deforms in a stable, repeatable manner upon the absorption of impact energy associated with an impact;
   wherein the enhanced strength regions and the untreated portions of the deformable elongated member are integral with each of the first half and the second half hexagonal shaped pieces of material and arranged in an alternating manner, wherein the enhanced strength regions are surface-treated regions of each of the first half and the second half hexagonal shaped pieces of material, and wherein the untreated portions are non-treated regions of each of the first half and the second half hexagonal shaped pieces of material,
   wherein the enhanced strength regions have a nanocrystalline microstructure based on having been treated with a surface manipulation technique, where the surface manipulation technique is Surface Mechanical Attrition Treatment (SMAT),
   wherein the enhanced strength regions have a uniform width and thickness that is the same as a uniform width and thickness of the untreated portions of the deformable elongated member,
   wherein the enhanced strength regions have a first uniform height that is different from a second uniform height of the untreated portions of the deformable elongated member, and
   wherein the energy absorbing device has a sloped end, the sloped end having a sloped surface with an angle relative to a flat plane vertical to the energy absorbing device.

2. An energy absorbing device in accordance with claim 1, wherein at least one of an interior portion and an exterior portion of the deformable elongate member is arranged to deform in a controlled manner.

3. An energy absorbing device in accordance with claim 2, wherein the at least one of an interior and an exterior portion includes the enhanced strength regions, which enhanced strength regions are areas of non-uniform strength distribution.

4. An energy absorbing device in accordance with claim 3, wherein the areas of non-uniform strength distribution have a yield strength at least 0.2% higher than the untreated portions.

5. An energy absorbing device in accordance claim 3, wherein the areas of non-uniform strength distribution are formed by at least one of a laser sintering technique, a temperature annealing technique, a magnetic technique, the application of electric current, and the application of light.

6. An energy absorbing device in accordance with claim 3, wherein the areas of non-uniform strength distribution are linearly shaped.

7. An energy absorbing device in accordance with claim 3, wherein the areas of non-uniform strength distribution form a pattern.

8. An energy absorbing device in accordance with claim 1, wherein a transverse cross section of the deformable elongate member is a polygon.

9. An energy absorbing device in accordance with claim 1, including a first fastening plate attached to a first end of the deformable elongate member.

10. An energy absorbing device in accordance with claim 1, including a second fastening plate attached to a second end of the deformable elongate member.

11. An energy absorbing device in accordance with claim 1, wherein the deformable elongated member is arranged to provide an increased contact area during an early stage of the impact such that the deformable elongated member absorbs the impact energy gradually in an axial direction during the early stage of the impact.

12. An energy absorbing device in accordance with claim 1, wherein the enhanced strength regions extend around the circumference of the hexagonal shaped deformable elongate member.

13. An energy absorbing device in accordance with claim 1, wherein the sloped end is shaped to gradually increase the contact area at an early stage of impact so a reaction force applied on the hexagonal shaped deformable elongate member in an axial direction is gradually increased while at the same time reducing probability of a collapse starting from a rear portion of the hexagonal shaped deformable elongate member.

* * * * *